United States Patent
Raichelgauz et al.

(10) Patent No.: US 11,238,066 B2
(45) Date of Patent: Feb. 1, 2022

(54) GENERATING PERSONALIZED CLUSTERS OF MULTIMEDIA CONTENT ELEMENTS BASED ON USER INTERESTS

(71) Applicant: Cortica Ltd., Tel Aviv (IL)

(72) Inventors: Igal Raichelgauz, Tel Aviv (IL);
Karina Odinaev, Tel Aviv (IL);
Yehoshua Y. Zeevi, Haifa (IL)

(73) Assignee: Cortica Ltd., Tel Aviv (IL)

( * ) Notice: Subject to any disclaimer, the term of this patent is extended or adjusted under 35 U.S.C. 154(b) by 20 days.

(21) Appl. No.: 16/720,568

(22) Filed: Dec. 19, 2019

(65) Prior Publication Data

US 2020/0186581 A1 Jun. 11, 2020

Related U.S. Application Data

(63) Continuation of application No. 15/452,148, filed on Mar. 7, 2017, now abandoned.
(Continued)

(51) Int. Cl.
*G06F 16/28* (2019.01)
*G06F 16/41* (2019.01)
(Continued)

(52) U.S. Cl.
CPC .......... *G06F 16/284* (2019.01); *G06F 3/048* (2013.01); *G06F 3/0484* (2013.01);
(Continued)

(58) Field of Classification Search
CPC ........ G07F 7/1008; G06F 13/00; G06F 21/64; G06F 16/284; G06F 16/41; G06F 16/433;
(Continued)

(56) References Cited

U.S. PATENT DOCUMENTS 6,640,015 B1 10/2003 Lafruit
7,801,893 B2 9/2010 Gulli
(Continued)

OTHER PUBLICATIONS

Jasinschi et al., A Probabilistic Layered Framework for Integrating Multimedia Content and Context Information, 2002, IEEE, p. 2057-2060. (Year: 2002).
(Continued)

*Primary Examiner* — Robert B Harrell
(74) *Attorney, Agent, or Firm* — Reches Patents

(57) ABSTRACT

A system and method for generating personalized multimedia content element clusters. The method includes determining, based on at least one interest, at least one personalized concept, wherein each personalized concept represents one of the at least one user interest; obtaining at least one multimedia content element related to a user; generating at least one signature for the at least one multimedia content element, each generated signature representing at least a portion of the at least one multimedia content element; determining, based on the generated at least one signature, at least one multimedia content element cluster, wherein each cluster includes a plurality of multimedia content elements sharing a common concept of the at least one personalized concept; and creating at least one personalized multimedia content element cluster by adding, to each determined cluster, at least one of the at least one multimedia content element sharing the common concept of the cluster.

23 Claims, 7 Drawing Sheets

Related U.S. Application Data

(60) Provisional application No. 62/307,517, filed on Mar. 13, 2016.

(51) Int. Cl.

| | |
|---|---|
| *G06F 16/432* | (2019.01) |
| *G06F 16/683* | (2019.01) |
| *G06F 16/783* | (2019.01) |
| *G06K 9/00* | (2006.01) |
| *G10L 15/26* | (2006.01) |
| *G06F 16/40* | (2019.01) |
| *G06F 16/43* | (2019.01) |
| *G06F 16/438* | (2019.01) |
| *G06F 3/048* | (2013.01) |
| *G06T 19/00* | (2011.01) |
| *G06N 5/02* | (2006.01) |
| *H04H 20/10* | (2008.01) |
| *H04H 20/26* | (2008.01) |
| *H04H 60/37* | (2008.01) |
| *H04H 60/46* | (2008.01) |
| *H04H 60/56* | (2008.01) |
| *H04H 60/66* | (2008.01) |
| *H04L 29/08* | (2006.01) |
| *H04N 7/173* | (2011.01) |
| *H04N 21/258* | (2011.01) |
| *H04N 21/2668* | (2011.01) |
| *H04N 21/466* | (2011.01) |
| *H04N 21/81* | (2011.01) |
| *G06F 16/904* | (2019.01) |
| *G06F 16/35* | (2019.01) |
| *G06F 16/51* | (2019.01) |
| *G06F 16/22* | (2019.01) |
| *G06F 16/174* | (2019.01) |
| *G06F 16/48* | (2019.01) |
| *G06F 16/951* | (2019.01) |
| *G06F 16/172* | (2019.01) |
| *G06F 16/14* | (2019.01) |
| *G06F 16/487* | (2019.01) |
| *G06Q 30/02* | (2012.01) |
| *H04H 60/59* | (2008.01) |
| *H04L 29/06* | (2006.01) |
| *G06N 5/04* | (2006.01) |
| *H04H 60/49* | (2008.01) |
| *H04H 60/71* | (2008.01) |
| *G09B 19/00* | (2006.01) |
| *G06F 16/435* | (2019.01) |
| *G06N 7/00* | (2006.01) |
| *G06F 16/955* | (2019.01) |
| *G06F 40/134* | (2020.01) |
| *G06F 3/0484* | (2013.01) |
| *G06F 3/0488* | (2013.01) |
| *H04H 20/93* | (2008.01) |
| *H04H 60/33* | (2008.01) |
| *H04H 60/58* | (2008.01) |
| *G06N 20/00* | (2019.01) |
| *G06F 16/738* | (2019.01) |
| *G06F 17/16* | (2006.01) |
| *G06N 3/063* | (2006.01) |
| *G06F 16/9535* | (2019.01) |
| *G10L 15/32* | (2013.01) |

(52) U.S. Cl.
CPC ............ *G06F 3/0488* (2013.01); *G06F 16/14* (2019.01); *G06F 16/152* (2019.01); *G06F 16/172* (2019.01); *G06F 16/1748* (2019.01); *G06F 16/2228* (2019.01); *G06F 16/285* (2019.01); *G06F 16/35* (2019.01); *G06F 16/40* (2019.01); *G06F 16/41* (2019.01); *G06F 16/43* (2019.01); *G06F 16/433* (2019.01); *G06F 16/434* (2019.01); *G06F 16/435* (2019.01); *G06F 16/438* (2019.01); *G06F 16/4393* (2019.01); *G06F 16/48* (2019.01); *G06F 16/487* (2019.01); *G06F 16/51* (2019.01); *G06F 16/683* (2019.01); *G06F 16/685* (2019.01); *G06F 16/739* (2019.01); *G06F 16/783* (2019.01); *G06F 16/7834* (2019.01); *G06F 16/7844* (2019.01); *G06F 16/7847* (2019.01); *G06F 16/904* (2019.01); *G06F 16/951* (2019.01); *G06F 16/9535* (2019.01); *G06F 16/9558* (2019.01); *G06F 17/16* (2013.01); *G06F 40/134* (2020.01); *G06K 9/00281* (2013.01); *G06K 9/00711* (2013.01); *G06K 9/00744* (2013.01); *G06N 3/063* (2013.01); *G06N 5/02* (2013.01); *G06N 5/025* (2013.01); *G06N 5/04* (2013.01); *G06N 7/005* (2013.01); *G06N 20/00* (2019.01); *G06Q 30/0201* (2013.01); *G06Q 30/0246* (2013.01); *G06Q 30/0261* (2013.01); *G06T 19/006* (2013.01); *G09B 19/0092* (2013.01); *G10L 15/26* (2013.01); *H04H 20/103* (2013.01); *H04H 20/26* (2013.01); *H04H 20/93* (2013.01); *H04H 60/33* (2013.01); *H04H 60/37* (2013.01); *H04H 60/46* (2013.01); *H04H 60/49* (2013.01); *H04H 60/56* (2013.01); *H04H 60/58* (2013.01); *H04H 60/59* (2013.01); *H04H 60/66* (2013.01); *H04H 60/71* (2013.01); *H04L 65/601* (2013.01); *H04L 67/02* (2013.01); *H04L 67/10* (2013.01); *H04L 67/22* (2013.01); *H04L 67/306* (2013.01); *H04L 67/327* (2013.01); *H04N 7/17318* (2013.01); *H04N 21/25891* (2013.01); *H04N 21/2668* (2013.01); *H04N 21/466* (2013.01); *H04N 21/8106* (2013.01); *G06K 2209/27* (2013.01); *G10L 15/32* (2013.01); *H04H 2201/90* (2013.01); *Y10S 707/99943* (2013.01); *Y10S 707/99948* (2013.01)

(58) Field of Classification Search
CPC .... G06F 16/434; G06F 16/683; G06F 16/685; G06F 16/7834; G06F 16/7844; G06F 16/7847; G06F 16/40; G06F 16/285; G06F 16/43; G06F 16/438; G06F 3/048; G06F 16/4393; G10H 1/0058; G06Q 20/341; H04J 3/16; H04J 3/18; H04J 3/22; H04L 9/3281; H04L 9/3286; H04L 12/28; H04L 12/56; H04L 12/288; H04L 12/4608; H04L 12/4641; H04L 12/4645; H04L 29/06; H04L 29/08; H04L 29/0653; H04L 29/0809; H04L 29/06095; H04L 29/08009; H04L 29/08072; H04L 47/10; H04L 49/351; H04L 63/08; H04L 69/14; H04L 63/101; H04L 63/102; H04L 67/141; H04L 67/146; H04L 20/103; H04L 20/26; H04L 67/10; H04Q 11/0478; H04W 80/02; Y02D 50/30; G06K 9/00744; G10L 15/26; G06T 19/006; G06N 5/02; H04H 20/103; H04H 20/26; H04H 60/37; H04H 60/46; H04H 60/56; H04H 60/66; H04N 7/17318; H04N 21/25891; H04N 21/2668

USPC ....... 706/10, 12; 707/803; 709/219; 713/180
See application file for complete search history.

(56) References Cited

U.S. PATENT DOCUMENTS

| | | | |
|---|---|---|---|
| 8,275,764 B2 | 9/2012 | Jeon | |
| RE44,225 E | 5/2013 | Aviv | |
| 8,527,978 B1 | 9/2013 | Sallam | |
| 8,634,980 B1 | 1/2014 | Urmson | |
| 8,781,152 B2 | 7/2014 | Momeyer | |
| 8,782,077 B1 | 7/2014 | Rowley | |
| 9,298,763 B1 | 3/2016 | Zack | |
| 9,440,647 B1 | 9/2016 | Sucan | |
| 9,734,533 B1 | 8/2017 | Givot | |
| 10,133,947 B2 | 11/2018 | Yang | |
| 10,347,122 B2 | 7/2019 | Takenaka | |
| 10,491,885 B1 | 11/2019 | Hicks | |
| 2002/0184505 A1* | 12/2002 | Mihcak | G10H 1/0058 713/180 |
| 2003/0037010 A1 | 2/2003 | Schmelzer | |
| 2004/0059736 A1 | 3/2004 | Willse | |
| 2004/0091111 A1 | 5/2004 | Levy | |
| 2004/0230572 A1 | 11/2004 | Omoigui | |
| 2005/0193015 A1 | 9/2005 | Logston | |
| 2006/0100987 A1 | 5/2006 | Leurs | |
| 2006/0120626 A1 | 6/2006 | Perlmutter | |
| 2006/0251339 A1 | 11/2006 | Gokturk | |
| 2007/0196013 A1 | 8/2007 | Li | |
| 2008/0109433 A1 | 5/2008 | Rose | |
| 2008/0152231 A1 | 6/2008 | Gokturk | |
| 2008/0166020 A1 | 7/2008 | Kosaka | |
| 2008/0270569 A1 | 10/2008 | McBride | |
| 2008/0294278 A1 | 11/2008 | Borgeson | |
| 2009/0022472 A1 | 1/2009 | Bronstein | |
| 2009/0034791 A1 | 2/2009 | Doretto | |
| 2009/0043818 A1 | 2/2009 | Raichelgauz | |
| 2009/0080759 A1 | 3/2009 | Bhaskar | |
| 2009/0216761 A1 | 8/2009 | Raichelgauz | |
| 2009/0278934 A1 | 11/2009 | Ecker | |
| 2010/0042646 A1 | 2/2010 | Raichelqauz | |
| 2010/0082684 A1 | 4/2010 | Churchill | |
| 2010/0111408 A1 | 5/2010 | Matsuhira | |
| 2010/0306193 A1 | 12/2010 | Pereira | |
| 2011/0029620 A1 | 2/2011 | Bonforte | |
| 2011/0038545 A1 | 2/2011 | Bober | |
| 2011/0246566 A1 | 10/2011 | Kashef | |
| 2012/0133497 A1 | 5/2012 | Sasaki | |
| 2012/0179751 A1 | 7/2012 | Ahn | |
| 2013/0103814 A1 | 4/2013 | Carrasco | |
| 2013/0212493 A1 | 8/2013 | Krishnamurthy | |
| 2013/0226820 A1 | 8/2013 | Sedota, Jr. | |
| 2014/0025692 A1 | 1/2014 | Pappas | |
| 2014/0059443 A1 | 2/2014 | Tabe | |
| 2014/0095425 A1 | 4/2014 | Sipple | |
| 2014/0111647 A1 | 4/2014 | Atsmon | |
| 2014/0201330 A1 | 7/2014 | Lozano Lopez | |
| 2014/0379477 A1 | 12/2014 | Sheinfeld | |
| 2015/0033150 A1 | 1/2015 | Lee | |
| 2015/0117784 A1 | 4/2015 | Lin | |
| 2015/0134688 A1 | 5/2015 | Jing | |
| 2015/0363644 A1 | 12/2015 | Wnuk | |
| 2016/0210525 A1 | 7/2016 | Yang | |
| 2016/0221592 A1 | 8/2016 | Puttagunta | |
| 2016/0342683 A1 | 11/2016 | Kwon | |
| 2016/0357188 A1 | 12/2016 | Ansari | |
| 2017/0032257 A1 | 2/2017 | Sharifi | |
| 2017/0041254 A1 | 2/2017 | Agara Venkatesha Rao | |
| 2017/0109602 A1 | 4/2017 | Kim | |
| 2017/0255620 A1 | 9/2017 | Raichelgauz | |
| 2017/0262437 A1 | 9/2017 | Raichelgauz | |
| 2017/0323568 A1 | 11/2017 | Inoue | |
| 2018/0081368 A1 | 3/2018 | Watanabe | |
| 2018/0101177 A1 | 4/2018 | Cohen | |
| 2018/0157916 A1 | 6/2018 | Doumbouya | |
| 2018/0158323 A1 | 6/2018 | Takenaka | |
| 2018/0204111 A1 | 7/2018 | Zadeh | |
| 2019/0005726 A1 | 1/2019 | Nakano | |
| 2019/0039627 A1 | 2/2019 | Yamamoto | |
| 2019/0043274 A1 | 2/2019 | Hayakawa | |
| 2019/0045244 A1 | 2/2019 | Balakrishnan | |
| 2019/0056718 A1 | 2/2019 | Satou | |
| 2019/0065951 A1 | 2/2019 | Luo | |
| 2019/0188501 A1 | 6/2019 | Ryu | |
| 2019/0220011 A1 | 7/2019 | Della Penna | |
| 2019/0317513 A1 | 10/2019 | Zhang | |
| 2019/0364492 A1 | 11/2019 | Azizi | |
| 2019/0384303 A1 | 12/2019 | Muller | |
| 2019/0384312 A1 | 12/2019 | Herbach | |
| 2019/0385460 A1 | 12/2019 | Magzimof | |
| 2019/0389459 A1 | 12/2019 | Berntorp | |
| 2020/0004248 A1 | 1/2020 | Healey | |
| 2020/0004251 A1 | 1/2020 | Zhu | |
| 2020/0004265 A1 | 1/2020 | Zhu | |
| 2020/0005631 A1 | 1/2020 | Visintainer | |
| 2020/0018606 A1 | 1/2020 | Wolcott | |
| 2020/0018618 A1 | 1/2020 | Ozog | |
| 2020/0020212 A1 | 1/2020 | Song | |
| 2020/0050973 A1 | 2/2020 | Stenneth | |
| 2020/0073977 A1 | 3/2020 | Montemerlo | |
| 2020/0090484 A1 | 3/2020 | Chen | |
| 2020/0097756 A1 | 3/2020 | Hashimoto | |
| 2020/0133307 A1 | 4/2020 | Kelkar | |
| 2020/0043326 A1 | 6/2020 | Tao | |

OTHER PUBLICATIONS

Jones et al., "Contextual Dynamics of Group-Based Sharing Decisions", 2011, University of Bath, p. 1777-1786. (Year: 2011).
Iwamoto, "Image Signature Robust to Caption Superimpostion for Video Sequence Identification", IEEE, pp. 3185-3188 (Year: 2006).
Cooperative Multi-Scale Convolutional Neural, Networks for Person Detection, Markus Eisenbach, Daniel Seichter, Tim Wengefeld, and Horst-Michael Gross Ilmenau University of Technology, Neuroinformatics and Cognitive Robotics Lab (Year; 2016).
Chen, Yixin, James Ze Wang, and Robert Krovetz. "CLUE: cluster-based retrieval of images by unsupervised learning." IEEE transactions on Image Processing 14.8 (2005); 1187-1201. (Year: 2005).
Wusk et al (Non-Invasive detection of Respiration and Heart Rate with a Vehicle Seat Sensor; www.mdpi.com/journal/sensors; Published: May 8, 2018). (Year: 2018).
Chen, Tiffany Yu-Han, et al. "Glimpse: Continuous, real-time object recognition on mobile devices." Proceedings of the 13th ACM Confrecene on Embedded Networked Sensor Systems. 2015. (Year: 2015).

* cited by examiner

GENERATING PERSONALIZED CLUSTERS OF MULTIMEDIA CONTENT ELEMENTS BASED ON USER INTERESTS

CROSS-REFERENCE TO RELATED APPLICATIONS

This application is a continuation of U.S. patent application Ser. No. 15/452,148 filing date Mar. 7, 2017 which claims the benefit of U.S. Provisional Application No. 62/307,517 filed on Mar. 13, 2016.

The contents of the above-referenced applications are hereby incorporated by reference.

TECHNICAL FIELD

The present disclosure relates generally to organizing multimedia content, and more specifically to clustering based on analysis of multimedia content elements.

BACKGROUND

As the Internet continues to grow exponentially in size and content, the task of finding relevant and appropriate information has become increasingly complex. Organized information can be browsed or searched more quickly than unorganized information. As a result, effective organization of content allowing for subsequent retrieval is becoming increasingly important.

Search engines are often used to search for information, either locally or over the World Wide Web. Many search engines receive queries from users and uses such queries to find and return relevant content. The search queries may be in the form of, for example, textual queries, images, audio queries, etc.

Search engines often face challenges when searching for multimedia content (e.g., images, audio, videos, etc.). In particular, existing solutions for searching for multimedia content are typically based on metadata of multimedia content elements. Such metadata may be associated with a multimedia content element and may include parameters such as, for example, size, type, name, short description, tags describing articles or subject matter of the multimedia content element, and the like. A tag is a non-hierarchical keyword or term assigned to data (e.g., multimedia content elements). The name, tags, and short description are typically manually provided by, e.g., the creator of the multimedia content element (for example, a user who captured the image using his smart phone), a person storing the multimedia content element in a storage, and the like.

Tagging has gained widespread popularity in part due to the growth of social networking, photograph sharing, and bookmarking of websites. Some websites allow users to create and manage tags that categorize content using simple keywords. The users of such sites manually add and define descriptions used for tags. Some of these websites only allow tagging of specific portions of multimedia content elements (e.g., portions of images showing people). Thus, the tags assigned to a multimedia content may not fully capture the contents shown therein.

Further, because at least some of the metadata of a multimedia content element is typically provided manually by a user, such metadata may not accurately describe the multimedia content element or facets thereof. As examples, the metadata may be misspelled, provided with respect to a different image than intended, vague or otherwise failing to identify one or more aspects of the multimedia content, and the like. As an example, a user may provide a file name "weekend fun" for an image of a cat, which does not accurately indicate the contents (e.g., the cat) shown in the image. Thus, a query for the term "cat" would not return the "weekend fun" image.

Additionally, different users may utilize different tags to refer to the same subject or topic, thereby resulting in some multimedia content elements related to a particular subject having one tag and other multimedia content elements related to the subject having a different tag. For example, one user may tag images of trees with the term "plants," while another user tags images of trees with the term "trees." Thus, a query based on either the tag "plants" or the tag "trees" will only return results including one of the images despite both images being relevant to the query.

Due to a need for delivering relevant content to users, solutions for identifying users' preferences have also been developed. Some existing solutions actively require an input from the users to specify their interests. However, profiles generated for users based on their inputs may be inaccurate as the users tend to provide information related to only their current interests, or only partial information due to privacy concerns. For example, users creating an account on Facebook® often provide only the mandatory information required for the creation of an account. Other existing solutions for identifying users' preferences track user activities online. However, such solutions may also result in inaccurate information, particularly when users search for information that may not actually be of particular interest.

User preferences are often utilized to provide relevant multimedia content to users. For example, known user preferences may be utilized by Facebook® to curate content to show up in a user's "feed." However, as noted above, user preferences may be unknown, incomplete, or otherwise inaccurate. Further, relevant multimedia content may be challenging to accurately identify. Specifically, some existing solutions for identifying relevant multimedia content element rely on analyzing or otherwise matching to metadata associated with the multimedia content to determine whether the content is relevant. However, as noted above, such metadata may be inaccurate or incomplete, thereby leading to failure to identify appropriate content.

It would therefore be advantageous to provide a solution that would overcome the deficiencies of the prior art.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

Some embodiments disclosed herein include a method for generating personalized multimedia content clusters. The method comprises: determining, based on at least one user interest of a user, at least one personalized concept, wherein each personalized concept represents one of the at least one user interest; obtaining at least one multimedia content element related to the user; generating at least one signature for the obtained at least one multimedia content element, each generated signature representing at least a portion of the obtained at least one multimedia content element; determining, based on the generated at least one signature, at least one multimedia content element cluster, wherein each multimedia content element cluster includes a plurality of clustered multimedia content elements sharing a common concept, wherein each common concept is one of the determined at least one personalized concept; and creating at least one personalized multimedia content element cluster by adding, to each determined cluster, at least one of the obtained at least one multimedia content element sharing the common concept of the cluster.

Some embodiments disclosed herein also include a non-transitory computer readable medium having stored thereon instructions for causing a processing circuitry to execute a process, the process comprising: determining, based on at least one user interest of a user, at least one personalized concept, wherein each personalized concept represents one of the at least one user interest; obtaining at least one multimedia content element related to the user; generating at least one signature for the obtained at least one multimedia content element, each generated signature representing at least a portion of the obtained at least one multimedia content element; determining, based on the generated at least one signature, at least one multimedia content element cluster, wherein each multimedia content element cluster includes a plurality of clustered multimedia content elements sharing a common concept, wherein each common concept is one of the determined at least one personalized concept; and creating at least one personalized multimedia content element cluster by adding, to each determined cluster, at least one of the obtained at least one multimedia content element sharing the common concept of the cluster.

Some embodiments disclosed herein also include a system for generating personalized multimedia content clusters. The system comprises a processing circuitry; and a memory, the memory containing instructions that, when executed by the processing circuitry, configure the system to: determine, based on at least one user interest of a user, at least one personalized concept, wherein each personalized concept represents one of the at least one user interest; obtain at least one multimedia content element related to the user; generate at least one signature for the obtained at least one multimedia content element, each generated signature representing at least a portion of the obtained at least one multimedia content element; determine, based on the generated at least one signature, at least one multimedia content element cluster, wherein each multimedia content element cluster includes a plurality of clustered multimedia content elements sharing a common concept, wherein each common concept is one of the determined at least one personalized concept; and create at least one personalized multimedia content element cluster by adding, to each determined cluster, at least one of the obtained at least one multimedia content element sharing the common concept of the cluster.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
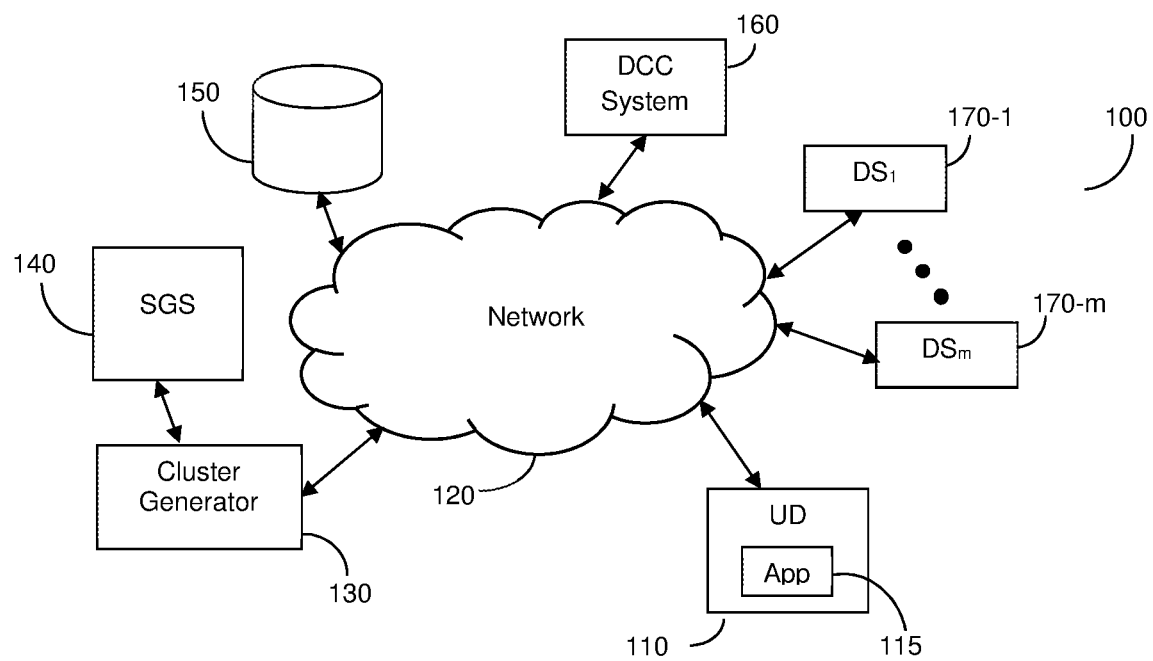
FIG. 1 is a network diagram utilized to describe the various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for generating personalized clusters of multimedia content elements (MMCEs). The clustering allows for organizing and searching of multimedia content elements based on common concepts that may be of interest to a user. In an example embodiment, a user profile may be created. User interests indicated in a user profile are identified. Based on the user interests, multimedia content elements to be clustered may be obtained. For each multimedia content element, at least one signature is generated. Based on the generated at least one signature, at least one search tag is generated for each multimedia content elements. Each of the multimedia content elements is added to a multimedia content element cluster based on the generated tags and the user interests, thereby creating personalized multimedia content element clusters. Each personalized cluster includes a plurality of multimedia content elements having at least one concept related to a user interest in common.

In an example embodiment, the common concept among multimedia content elements of a multimedia content element cluster may be a collection of signatures representing elements of the unstructured data and metadata describing the concept. The common concept may represent an item or aspect of the multimedia content elements such as, but not limited to, an object, a person, an animal, a pattern, a color, a background, a character, a sub textual aspect (e.g., an aspect indicating sub textual information such as activities or actions being performed, relationships among individuals shown such as teams or members of an organization, etc.), a meta aspect indicating information about the multimedia content element itself (e.g., an aspect indicating that an image is a "selfie" taken by a person in the image), words, sounds, voices, motions, combinations thereof, and the like. Multimedia content elements may share a common concept when each of the multimedia content elements is associated with at least one signature, at least one portion of a signature, at least one tag, or a combination thereof, that is common to all of the multimedia content elements sharing a common concept.

In an embodiment, the at least one multimedia content element may be clustered based further on metadata associated with a user. The user may be, but is not limited to, a user of a user device in which the at least one multimedia content element is stored. In another embodiment, the clustering may include searching, based on the generated at least one signature, for clusters including multimedia content elements sharing a common concept. The searching may further include comparing the generated at least one signature to signatures of a plurality of multimedia content element clusters to determine matching signatures, where the at least one multimedia content element may be added to a cluster associated with matching signatures.

FIG. 1 shows an example network diagram 100 utilized to describe the various embodiments disclosed herein. The example network diagram 100 includes a user device 110, a personalized cluster generator 130, a signature generator system 140, a database 150, a deep content classification (DCC) system 160, and a plurality of data sources 170-1 through 170-m (hereinafter referred to individually as a data source 170 and collectively as data sources 170, merely for simplicity purposes), communicatively connected via a network 120. The network 120 may be the Internet, the world-wide-web (WWW), a local area network (LAN), a wide area network (WAN), a metro area network (MAN), and other networks capable of enabling communication between the components of the network diagram 100.

The user device 110 may be, but is not limited to, a personal computer (PC), a personal digital assistant (PDA), a mobile phone, a smart phone, a tablet computer, a wearable computing device, a smart television, and other devices configured for storing, viewing, and sending multimedia content elements. The user device 110 may have installed thereon an application (app) 115. The application 115 may be downloaded from applications repositories such as, but not limited to, the AppStore®, Google Play®, or any other repositories storing applications. The application 115 may be pre-installed in the user device 110. The application 115 may be, but is not limited to, a mobile application, a virtual application, a web application, a native application, and the like. In an example implementation, the application 115 may be a web browser.

In an embodiment, the cluster generator 130 is configured to generate personalized clusters of multimedia content elements. The cluster generator 130 typically includes, but is not limited to, a processing circuitry connected to a memory, the memory containing instructions that, when executed by the processing circuitry, configure the cluster generator 130 to at least perform generation of personalized clusters of multimedia content elements as described herein. In an embodiment, the processing circuitry may be realized as an array of at least partially statistically independent computational cores, the properties of each core being set independently of the properties of each other core. An example block diagram of the cluster generator 130 is described further herein below with respect to FIG. 2.

In an embodiment, the cluster generator 130 may be configured to generate a user profile for a user. In a further embodiment, the user profile may be generated based on tracking of impressions of the user while viewing multimedia content. As an example, a tracking agent or other means for collection information installed on the user device 110 may be configured to provide the cluster generator 130 with tracking information related to each of the multimedia elements viewed or uploaded by the user and the interaction of the user with the multimedia elements. The information may include, but is not limited to, the multimedia element (or a URL referencing the element), the amount of time the user viewed the multimedia element, the user's gesture with respect to the multimedia element, a URL of a webpage that the element was viewed or uploaded to, and so on.

In an embodiment, the cluster generator 130 is configured to determine the user impression with respect to the received tracking information. The user impression may be determined per each multimedia element or for a group of elements. As noted above, the user impression indicates the user attention with respect to a multimedia content element. In one embodiment, the cluster generator 130 may first filter the tracking information to remove details that cannot help in the determination of the user impression. A user impression may be determined by, e.g., a user's click on an element, a scroll, hovering over an element with a mouse, change in volume, one or more key strokes, and so on. These impressions may further be determined to be either positive (i.e., demonstrating that a user is interested in the impressed element) or negative (i.e., demonstrating that a user is not particularly interested in the impressed element). Each impression may be represented by a value indicating the degree of impression as well as whether the impression is positive or negative. According to one embodiment, a filtering operation may be performed in order to analyze only meaningful impressions. Impressions may be determined as meaning measures and thereby ignored, e.g., if they fall under a predefined threshold.

In an embodiment, the cluster generator 130 may be configured to send the multimedia element or elements that are determined as having a positive user impression to the SGS 140. The SGS 140 is then configured to generate at least one signature for each multimedia element or each portion thereof. The generated signature(s) may be robust to noise and distortions as discussed below.

It should be appreciated that signatures may be used for profiling the user's interests, because signatures allow more accurate reorganization of multimedia elements in comparison than, for example, utilization of metadata. The signatures generated by the SGS 140 for the multimedia elements allow for recognition and classification of multimedia elements such as content-tracking, video filtering, multimedia taxonomy generation, video fingerprinting, speech-to-text, audio classification, element recognition, video/image search and any other application requiring content-based signatures generation and matching for large content volumes such as, web and other large-scale databases. For example, a signature generated by the SGS 140 for a picture showing a car enables accurate recognition of the model of the car from any angle at which the picture was taken.

In one embodiment, the generated signatures are matched against a database of concepts (not shown) to identify a concept that can be associated with the signature, and hence the multimedia element. For example, an image of a tulip would be associated with a concept of flowers.

The cluster generator 130 creates the user profile using the identified concepts. That is, for each user, when a number of similar or identical concepts for multiple multimedia elements have been identified over time, the user's preference or interest can be established. The interest may be saved to a user profile created for the user. Whether two concepts are sufficiently similar or identical may be determined, e.g., by performing concept matching between the concepts. A concept (or a matching concept) is a collection of signatures representing a plurality of multimedia content elements and metadata describing the concept. The collection of signatures is a signature reduced cluster generated by inter-matching signatures generated for the plurality of multimedia elements.

For example, a concept of flowers may be determined as associated with a user interest in 'flowers' or 'gardening.' In one embodiment, the user interest may simply be the identified concept. In another embodiment, the interest may be determined using an association table which associates one or more identified concepts with a user interest. For example, the concept of 'flowers' and 'spring' may be associated with the interest of 'gardening'. Such an association table may be maintained in the cluster generator 130 or in the database 150.

In an embodiment, the cluster generator 130 may be configured to receive, from the user device 110, a request to generate personalized multimedia content element clusters. Clustering each of the multimedia content elements may include generating a cluster based on two or more multimedia content elements, or adding a multimedia content element to an existing cluster. The request may include, but is not limited to, the multimedia content element or plurality of multimedia content elements, an identifier of a user or user profile. As a non-limiting example, the request may include a user name. Alternatively or collectively, the cluster generator 130 may be configured to generate personalized multimedia content elements at periodic time intervals, upon detection of a cluster generation trigger event, and the like.

In an embodiment, the cluster generator 130 is configured to identify concepts representing user interests in a user profile of a user and to obtain, based on the identified user interests, multimedia content elements to be clustered into personalized clusters. Each obtained multimedia content element is related to an interest of the user and may include, but is not limited to, images, graphics, video streams, video clips, audio streams, audio clips, video frames, photographs, images of signals (e.g., spectrograms, phasograms, scalograms, etc.), combinations thereof, portions thereof, and the like.

In an embodiment, the multimedia content elements may be obtained from the data sources 170. Each of the data sources 170 may be, but is not limited to, a web server, an application server, a data repository, a database, and the like. Each of the data sources 170 may store data related to, e.g., social networks (e.g., Google+®, Facebook®, Twitter®, Instagram, etc.), web blogs, news feeds, photo albums, and the like. More specifically, the data sources 170 may store tracking information at least for multimedia content elements related to the user (e.g., multimedia content elements uploaded by the user, multimedia content elements in which the user is tagged, multimedia content elements otherwise associated by the user, and the like). The tracking information for each multimedia content element may include, but is not limited to, the multimedia content element, an identifier of the data source the multimedia content is stored in (e.g., an identifier indicating that the multimedia content element is from Facebook®), text entered in relation to uploading of the multimedia content element (e.g., a caption or tag provided by a user when uploading an image), a unique identifier of the user (e.g., a user name), user activity with respect to the multimedia content element (e.g., gestures such as clicks, scrolls, hovers, etc.), or a combination thereof. As a non-limiting example, the data source 170-4 may be a server of a social media website such that the obtained multimedia content elements used to generate the personalized clusters may be, e.g., images and videos posted on the social media website.

The obtained multimedia content elements are relevant to the identified interests. To this end, in an embodiment, obtaining the multimedia content elements may include searching for multimedia content elements associated with concepts matching the identified interests above a threshold. A multimedia content element may be associated with a matching concept if metadata of the multimedia content element matches metadata representing the user interest, if a signature of the multimedia content element matches a signature representing the user interest, or a combination thereof.

In an optional embodiment, the cluster generator 130 may be configured to send, to the signature generator system 140, each obtained multimedia content element. The signature generator system 140 is configured to generate signatures based on the sent multimedia content elements and to send the generated signatures to the cluster generator 130. In another embodiment, the cluster generator 130 may be configured to generate the signatures. Generation of signatures based on multimedia content elements is described further herein below with respect to FIGS. 3 and 4. In another embodiment, the signatures generated for more than one multimedia content element may be clustered.

The DCC system 160 may be configured to continuously create a knowledge database for multimedia data. To this end, the DCC system 160 may be configured to initially receive a large number of multimedia content elements to create a knowledge database that is condensed into concept structures (hereinafter referred to as "concepts") that are efficient to store, retrieve, and check for matches. As new multimedia content elements are collected by the DCC system 160, they are efficiently added to the knowledge base and concepts such that the resource requirement is generally sub-linear rather than linear or exponential. The DCC system 160 is configured to extract patterns from each multimedia content element and selects the important/salient patterns for the creation of signatures thereof. A process of inter-matching between the patterns followed by clustering, is followed by reduction of the number of signatures in a cluster to a minimum that maintains matching and enables generalization to new multimedia content elements. Metadata respective of the multimedia content elements is collected, thereby forming, together with the reduced clusters, a concept.

In a further embodiment, the cluster generator 130 may be configured to obtain, from the DCC system 160, at least one concept matching each of the obtained multimedia content elements. In yet a further embodiment, the cluster generator 130 may be configured to query the DCC system 160 for the at least one matching concept. The query may be made with respect to the signatures for the multimedia content elements to be clustered. In an embodiment, multimedia content elements associated with the obtained matching concepts may be utilized for determining clusters to which the multimedia content elements to be clustered are added.

In an embodiment, the cluster generator 130 is configured to generate, based on the signatures for the multimedia content elements to be clustered, at least one tag for each multimedia content element. Each tag is a textual index term assigned to content. The generated tags are searchable (e.g., by the user device 110 or other user devices), and may be included in metadata for the multimedia content element. In an embodiment, the tags may be generated based on metadata of the obtained at least one concept. As a non-limiting example, if metadata of an obtained concept includes the word "Superman®", the generated tags may include the textual term "Superman®".

In an embodiment, based on the identified interests and based on the generated signatures, the generated tags, or both, the cluster generator 130 is configured to determine at least one multimedia content element cluster for each obtained multimedia content element. Each determined multimedia content element cluster includes a plurality of multimedia content elements sharing at least one common concept with each other and with the obtained multimedia content elements to be clustered.

The common concept of a plurality of multimedia content elements may be a collection of signatures representing elements of the unstructured data and metadata describing the concept. The common concept may represent an item or aspect of the multimedia content element such as, but not limited to, an object, a person, an animal, a pattern, a color, a background, a character, a sub textual aspect, a meta aspect, words, sounds, voices, motions, combinations thereof, and the like. In a further embodiment, multimedia content elements may share a common concept when each of the multimedia content elements is associated with at least one signature, at least one portion of a signature, at least one tag, or a combination thereof, that is common to the multimedia content elements sharing a common concept.

In an embodiment, each determined multimedia content element cluster includes a common concept related to one or more of the user's interests. In an embodiment, a common concept may be related to the user interest when the signatures of the common concept match signatures representing the user interest above a predetermined threshold.

It should be noted that multiple multimedia content element clusters may be determined for each multimedia content element, with each determined multimedia content element cluster being related to an interest of the user. As a non-limiting example, for an image showing a "selfie" of a person (i.e., an image showing the person that is captured by the person) taken on the beach, multimedia content element clusters including multimedia content elements showing selfies of the person or of other people and showing beach scenery may be determined when a user interest indicates that the user is interested in selfies and beach trips, and the selfie image may be clustered into each of the determined multimedia content element clusters.

In a further embodiment, determining the multimedia content element clusters may include comparing the generated signatures or the generated tags to signatures or tags, respectively, of a plurality of multimedia content element clusters. Each determined multimedia content element cluster may be, e.g., a cluster having signatures or tags that match the generated signatures or tags above a predetermined threshold. As a non-limiting example, a signature is generated based on a video showing a stand-up comedy performance by the comedian Jerry Seinfeld, and tags including "Jerry Seinfeld" and "stand-up comedy" are generated based on the generated signature. In yet a further embodiment, the determined multimedia content element clusters may include one cluster for each tag.

In yet a further embodiment, one or more of the multimedia content element clusters may be included in or associated with a concept such that the comparison may include comparing the generated signatures or the generated tags to a reduced set of signatures or metadata of the concept, respectively. In a further embodiment, the multimedia content elements to be clustered may be added to the concept having matching multimedia content element clusters.

In another embodiment, if no existing multimedia content element clusters having concepts in common with the multimedia content element can be found (e.g., if no signatures or tags match the generated signatures or tags above a predetermined threshold), the cluster generator 130 may be configured to generate a multimedia content element cluster including the multimedia content elements to be clustered. Generating the multimedia content element cluster may include, but is not limited to, searching in one or more data sources (e.g., the user device 110, the database 150, or other data sources not shown that may be accessible over, e.g., the Internet) to identify multimedia content elements sharing common concepts with the multimedia content element. The searching may be based on the generated signatures, the generated tags, or both. The identified multimedia content elements are clustered with the multimedia content element to be clustered, and the resulting cluster may be stored in, e.g., the database 150. In a further embodiment, the generated cluster may further include the generated tags.

It should be noted that using signatures for tagging multimedia content elements, clustering multimedia content elements, representing user interests, or a combination thereof, ensures more accurate generation of personalized multimedia content element clusters than, for example, when using manually provided metadata (e.g., tags provided by users). For instance, in order to cluster an image of a sports car into an appropriate cluster, it may be desirable to locate a car of a particular model. However, in most cases the model of the car would not be part of the metadata associated with the multimedia content (image). Moreover, the car shown in an image may be at angles different from the angles of a specific photograph of the car that is available as a search item. The signature generated for that image would enable accurate recognition of the model of the car because the signatures generated for the multimedia content elements, according to the disclosed embodiments, allow for recognition and classification of multimedia content elements, such as, content-tracking, video filtering, multimedia taxonomy generation, video fingerprinting, speech-to-text, audio classification, element recognition, video/image search and any other application requiring content-based signatures generation and matching for large content volumes such as, web and other large-scale databases.

The database 150 stores multimedia content elements, clusters of multimedia content elements, association tables of concepts and associated user interests, user profiles indicating user interests, or a combination thereof. In the example network diagram 100 shown in FIG. 1, the cluster generator 130 communicates with the database 150 through the network 120. In other non-limiting configurations, the cluster generator 130 may be directly connected to the database 150. The database 150 may be accessible to, e.g., the user device 110, other user devices (not shown), or both, thereby allowing for retrieval of clusters from the database 150 by such user devices.

It should also be noted that the signature generator system 140 and the DCC system 160 are shown in FIG. 1 as being separate from the cluster generator 130 merely for simplicity purposes and without limitation on the disclosed embodiments. The signature generator system 140, the DCC system 160, or both, may be included in the cluster generator 130 without departing from the scope of the disclosure.

It should be further noted that the personalized cluster generation is described as being performed by the cluster generator 130 merely for simplicity purposes and without limitation on the disclosed embodiments. The personalized cluster generation may be equally performed locally by, e.g., the user device 110, without departing from the scope of the disclosure. In such a case, the user device 110 may include the cluster generator 130, the signature generator system 140, the DCC system 160, or any combination thereof, or may otherwise be configured to perform any or all of the processes performed by such systems. Further, local clustering by the user device 110 may be based on multimedia content clusters stored locally on the user device 110.

Figure 2:
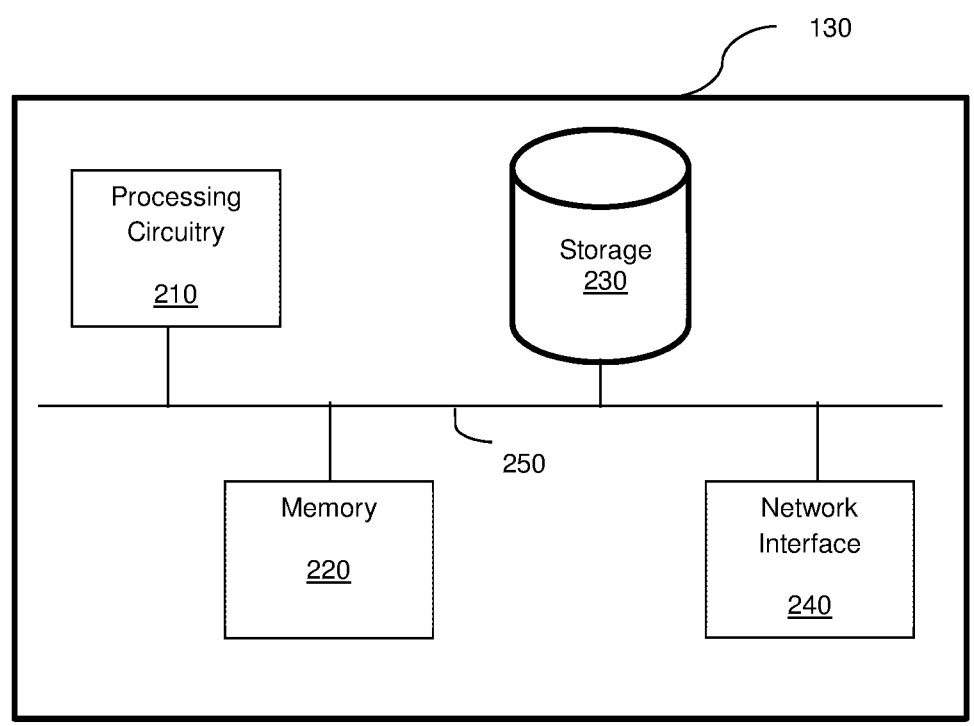
FIG. 2 is a block diagram illustrating a personalized cluster generator according to an embodiment.

FIG. 2 is an example block diagram illustrating the personalized cluster generator 130 implemented according to an embodiment. The cluster generator 130 includes a processing circuitry 210 coupled to a memory 220, a storage 230, and a network interface 240. In an embodiment, the components of the cluster generator 130 may be communicatively connected via a bus 250.

The processing circuitry 210 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information. In an embodiment, the processing circuitry 210 may be realized as an array of at least partially statistically independent computational cores. The properties of each computational core are set independently of those of each other core, as described further herein above.

The memory 220 may be volatile (e.g., RAM, etc.), non-volatile (e.g., ROM, flash memory, etc.), or a combination thereof. In one configuration, computer readable instructions to implement one or more embodiments disclosed herein may be stored in the storage 230.

In another embodiment, the memory 220 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 210, cause the processing circuitry 210 to perform the various processes described herein. Specifically, the instructions, when executed, cause the processing circuitry 210 to perform generation of personalized clusters of multimedia content elements as described herein.

The storage 230 may be magnetic storage, optical storage, and the like, and may be realized, for example, as flash memory or other memory technology, CD-ROM, Digital Versatile Disks (DVDs), or any other medium which can be used to store the desired information.

The network interface 240 allows the cluster generator 130 to communicate with the signature generator system 140 for the purpose of, for example, sending multimedia content elements, receiving signatures, and the like. Additionally, the network interface 240 allows the cluster generator 130 to communicate with the data sources 170 in order to obtain multimedia content elements to be clustered.

It should be understood that the embodiments described herein are not limited to the specific architecture illustrated in FIG. 2, and other architectures may be equally used without departing from the scope of the disclosed embodiments. In particular, the cluster generator 130 may further include a signature generator system configured to generate signatures as described herein without departing from the scope of the disclosed embodiments.

Figure 3:
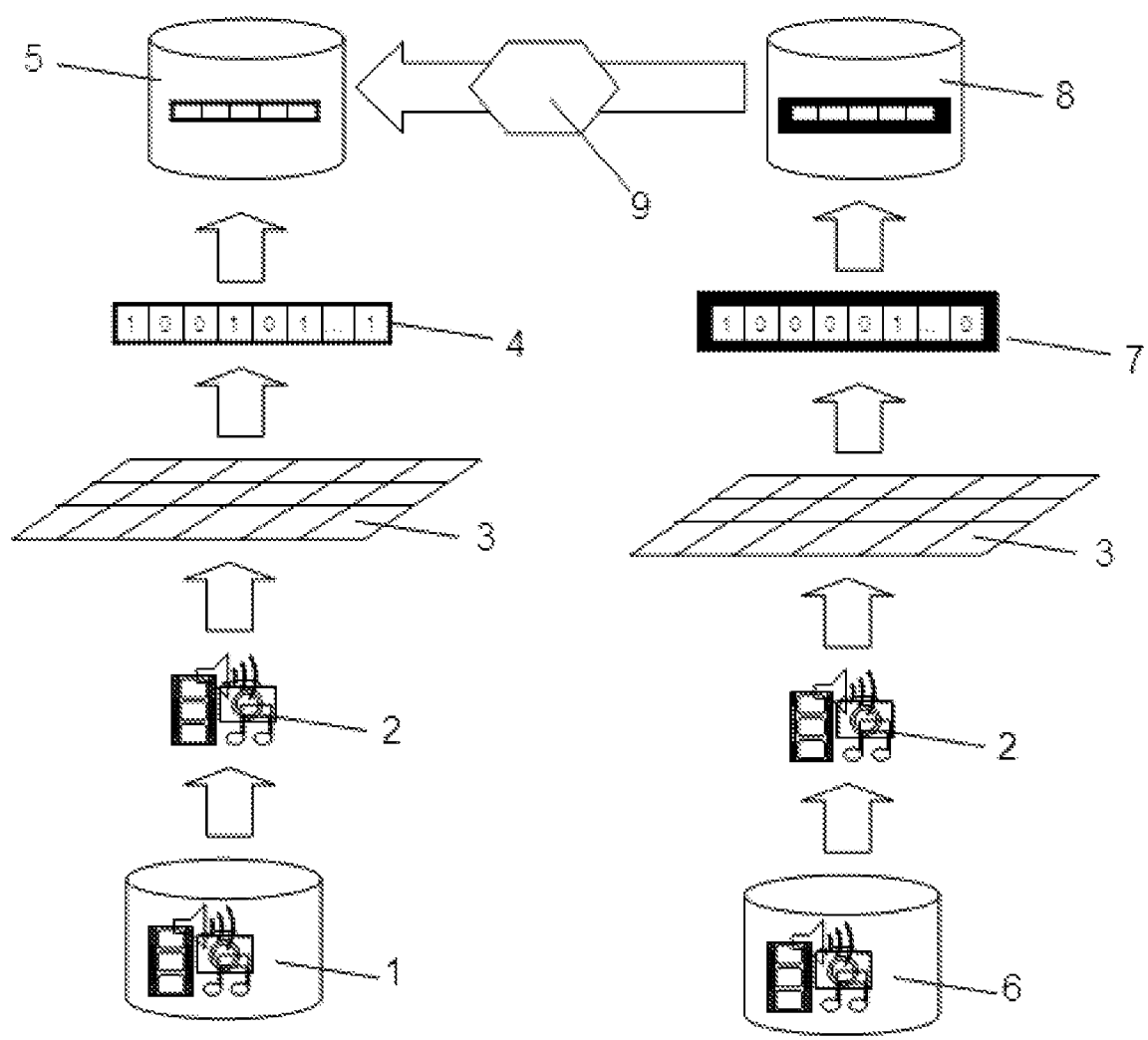
FIG. 3 is a block diagram depicting the basic flow of information in the signature generator system.
Figure 4:
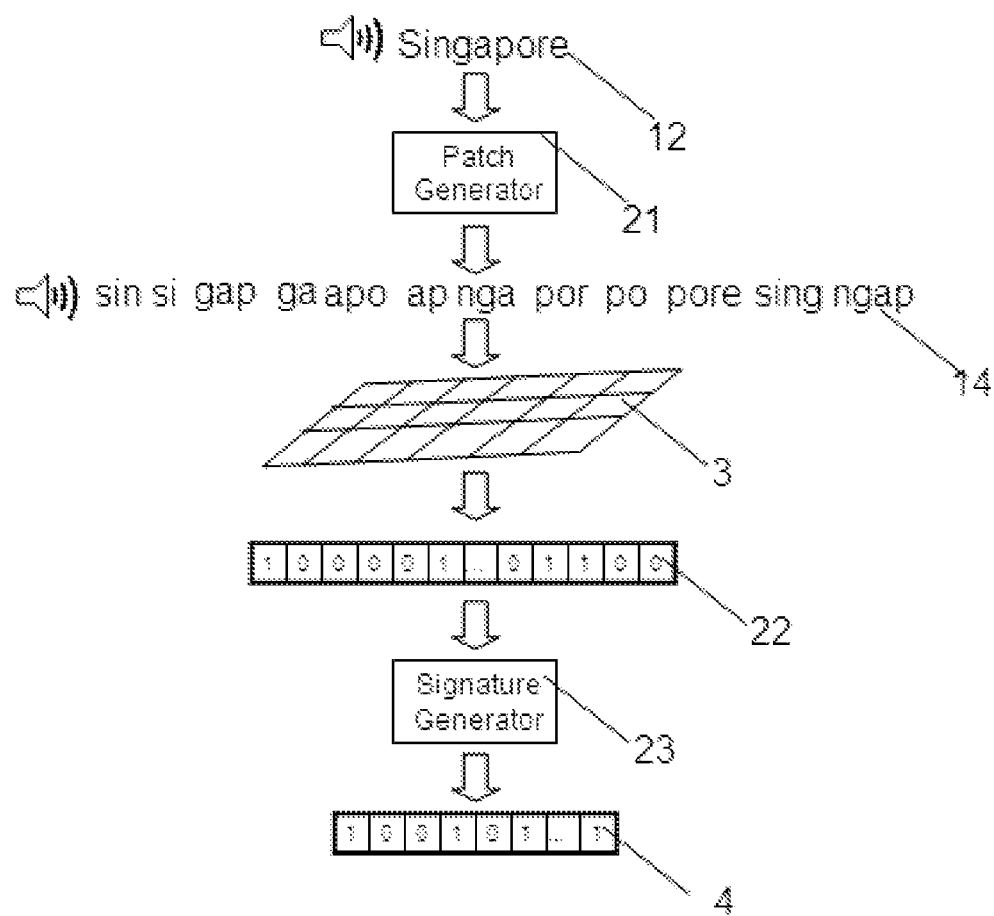
FIG. 4 is a diagram showing the flow of patches generation, response vector generation, and signature generation in a large-scale speech-to-text system.

FIGS. 3 and 4 illustrate the generation of signatures for the multimedia content elements by the signature generator system 140 according to an embodiment. An example high-level description of the process for large scale matching is depicted in FIG. 3. In this example, the matching is for a video content.

Video content segments 2 from a Master database (DB) 6 and a Target DB 1 are processed in parallel by a large number of independent computational Cores 3 that constitute an architecture for generating the Signatures (hereinafter the "Architecture"). Further details on the computational Cores generation are provided below. The independent Cores 3 generate a database of Robust Signatures and Signatures 4 for Target content-segments 5 and a database of Robust Signatures and Signatures 7 for Master content-segments 8. An exemplary and non-limiting process of signature generation for an audio component is shown in detail in FIG. 4. Finally, Target Robust Signatures and/or Signatures are effectively matched, by a matching algorithm 9, to Master Robust Signatures and/or Signatures database to find all matches between the two databases.

To demonstrate an example of the signature generation process, it is assumed, merely for the sake of simplicity and without limitation on the generality of the disclosed embodiments, that the signatures are based on a single frame, leading to certain simplification of the computational cores generation. The Matching System is extensible for signatures generation capturing the dynamics in-between the frames.

The Signatures' generation process is now described with reference to FIG. 4. The first step in the process of signatures generation from a given speech-segment is to breakdown the speech-segment to K patches 14 of random length P and random position within the speech segment 12. The breakdown is performed by the patch generator component 21. The value of the number of patches K, random length P and random position parameters is determined based on optimization, considering the tradeoff between accuracy rate and the number of fast matches required in the flow process of the context server 130 and SGS 140. Thereafter, all the K patches are injected in parallel into all computational Cores 3 to generate K response vectors 22, which are fed into a signature generator system 23 to produce a database of Robust Signatures and Signatures 4.

In order to generate Robust Signatures, i.e., Signatures that are robust to additive noise L (where L is an integer equal to or greater than 1) by the Computational Cores 3 a frame 'i' is injected into all the Cores 3. Then, Cores 3 generate two binary response vectors: $\vec{S}$ which is a Signature vector, and $\vec{RS}$ which is a Robust Signature vector.

For generation of signatures robust to additive noise, such as White-Gaussian-Noise, scratch, etc., but not robust to distortions, such as crop, shift and rotation, etc., a core $Ci=\{ni\}(1 \leq i \leq L)$ may consist of a single leaky integrate-to-threshold unit (LTU) node or more nodes. The node ni equations are:

$$V_i = \sum_j w_{ij} k_j$$

$$n_i = \theta(V_i - Th_x)$$

where, $\theta$ is a Heaviside step function; $w_{ij}$ is a coupling node unit (CNU) between node i and image component j (for example, grayscale value of a certain pixel j); kj is an image component 'j' (for example, grayscale value of a certain pixel j); $Th_x$ is a constant Threshold value, where 'x' is 'S' for Signature and 'RS' for Robust Signature; and Vi is a Coupling Node Value.

The Threshold values $Th_x$ are set differently for Signature generation and for Robust Signature generation. For example, for a certain distribution of Vi values (for the set of nodes), the thresholds for Signature ($Th_S$) and Robust Signature ($Th_{RS}$) are set apart, after optimization, according to at least one or more of the following criteria:

1: For: $V_i > Th_{RS}$
   $1-p(V>Th_S)-1-(1-\varepsilon)^l \gg 1$
   i.e., given that l nodes (cores) constitute a Robust Signature of a certain image l, the probability that not all of these l nodes will belong to the Signature of same, but noisy image, Ĩ is sufficiently low (according to a system's specified accuracy).

2: $p(V_i > Th_{RS}) \approx l/L$
   i.e., approximately l out of the total L nodes can be found to generate a Robust Signature according to the above definition.

3: Both Robust Signature and Signature are generated for certain frame i.

It should be understood that the generation of a signature is unidirectional, and typically yields lossless compression, where the characteristics of the compressed data are maintained but the uncompressed data cannot be reconstructed. Therefore, a signature can be used for the purpose of comparison to another signature without the need of comparison to the original data. The detailed description of the Signature generation can be found in U.S. Pat. Nos. 8,326,775 and 8,312,031, assigned to the common assignee, which are hereby incorporated by reference for all the useful information they contain.

A Computational Core generation is a process of definition, selection, and tuning of the parameters of the cores for a certain realization in a specific system and application. The process is based on several design considerations, such as:

(a) The Cores should be designed so as to obtain maximal independence, i.e., the projection from a signal space should generate a maximal pair-wise distance between any two cores' projections into a high-dimensional space.

(b) The Cores should be optimally designed for the type of signals, i.e., the Cores should be maximally sensitive to the spatio-temporal structure of the injected signal, for example, and in particular, sensitive to local correlations in time and space. Thus, in some cases a core represents a dynamic system, such as in state space, phase space, edge of chaos, etc., which is uniquely used herein to exploit their maximal computational power.

(c) The Cores should be optimally designed with regard to invariance to a set of signal distortions, of interest in relevant applications.

A detailed description of the Computational Core generation and the process for configuring such cores is discussed in more detail in the above-referenced U.S. Pat. No. 8,655,801.

Figure 5:
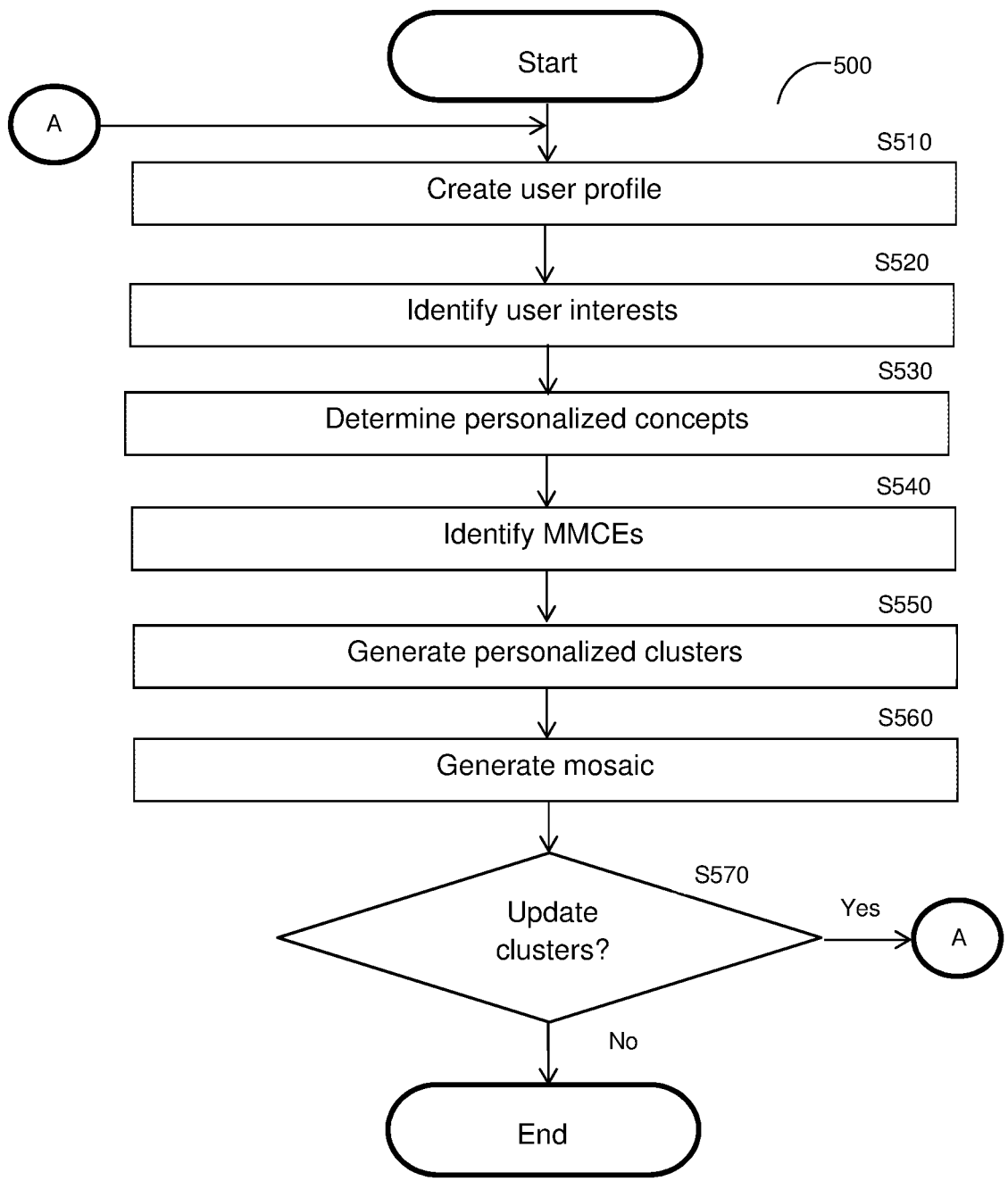
FIG. 5 is a flowchart illustrating a method for generating personalized clusters according to an embodiment.

FIG. 5 is an example flowchart 500 illustrating a method for generating personalized multimedia content element clusters for a user according to an embodiment. In an embodiment, the method may be performed by the personalized cluster generator 130, FIG. 1.

At optional S510, a user profile is created. The created user profile includes at least one user interest of a user as determined based on multimedia content elements associated with the user, multimedia contents viewed by the user, user interactions with multimedia content elements viewed by the user, or a combination thereof. In an embodiment, creating the user profile includes determining interests of the user based on tracking information for multimedia content elements related to the user. In a further embodiment, the user interests may be determined based on concepts of multimedia content elements of interest to the user. In an embodiment, S510 further includes storing the created user profile in a database (e.g., the database 150, FIG. 1). An example method for creating user profiles based on multimedia content is described further herein below with respect to FIG. 7.

Multimedia content elements related to the user may include, but are not limited to, multimedia contents provided by the user (e.g., uploaded to a social media account by the user), multimedia content elements associated with an identifier of the user (e.g., multimedia content elements having tags that indicate a user name of the user), or both. The tracking information for a multimedia content element may include, but is not limited to, the multimedia content element, an identifier of the data source the multimedia content is stored in (e.g., an identifier indicating that the multimedia content element is from Facebook®), text entered in relation to uploading of the multimedia content element (e.g., a caption or tag provided by a user when uploading an image), a unique identifier of the user (e.g., a user name), user activity with respect to the multimedia content element (e.g., gestures such as clicks, scrolls, hovers, etc.), or a combination thereof.

In a further embodiment, creating the user profile may further include determining, based on the tracking information, a user impression for each multimedia content element or group of multimedia content elements identified or included in the tracking information. The user impression for a multimedia content element or group of multimedia content elements at least indicates whether the user is interested in the multimedia content elements and, to this end, may be positive (i.e., indicating an interest in the subject matter of the multimedia content elements) or negative (i.e., indicating a lack of interest). The user impression may further indicate a degree of interest. In some embodiments, only multimedia content elements or groups of multimedia content elements that are meaningful (e.g., multimedia content elements associated with a degree of interest above a predetermined threshold) may be of interest to the user.

As a non-limiting example, if images of the user show the user riding a bicycle, the user profile may indicate user interest such as "bicycles," "extreme sports," "outdoor activity," and the like. As another non-limiting example, if videos showing the user holding a baby with the tag "my daughter," the user interests may indicate that the user has a baby daughter.

In an embodiment, if a user profile already exists for the user, S510 may include updating the user profile. In a further embodiment, the user profile may be updated when, e.g., new tracking information is obtained, at predetermined time intervals, both, and the like.

At S520, at least one user interest is identified. The identified at least one user interest may be indicated in a user profile associated with the user. The user profile may be, but is not limited to, the user profile created at S510, a previously created user profile, and the like. In an embodiment, S520 includes querying a user profile of the user for the at least one user interest.

At S530, at least one personalized concept is determined based on the identified at least one user interest. Each personalized concept represents an interest of the user and is utilized as a common concept for the personalized multimedia content element clusters. Each personalized concept may be represented by a signature. To this end, in an embodiment, S530 may include generating a signature for each identified user interest, where a concept represented by the signature is utilized as the common concept for a personalized multimedia content element cluster. As a non-limiting example, if the user interest is "fishing," a signature representing the concept of "fishing" may be utilized to represent the personalized concept for the user.

At S540, a plurality of multimedia content elements related to the user is identified. The identified multimedia content elements may include, but are not limited to, multimedia content elements uploaded by the user, multimedia content elements associated with identifiers of the user (e.g., multimedia content elements having tags indicating an identifier of the user), both, and the like.

At S550, at least one personalized multimedia content element cluster is generated based on the identified multimedia content elements. Each cluster includes a plurality of the identified multimedia content elements having one of the determined at least one personalized concept as a common concept. The clusters allow for organization of multimedia content elements with respect to subject matter, thereby allowing for targeted searches of multimedia content elements, convenient viewing of related multimedia content elements, and the like. In an embodiment, if a personalized cluster already exists for a user interest of the user, S550 may include updating the personalized cluster by adding the obtained multimedia content elements. In a further embodiment, duplicate multimedia content elements may be excluded from the updated personalized clusters. Generating clusters of multimedia content elements is described further herein below with respect to FIG. 6.

At optional S560, a personalized mosaic may be generated. The personalized mosaic represents personalized clusters associated with the user and may include, but is not limited to, an icon representing each cluster, a textual description of the content of each cluster, or a combination thereof. The generated mosaic may be an interactive mosaic allowing for viewing of a respective personalized cluster when a user interacts with, e.g., an icon of the mosaic representing the personalized cluster.

At S570, it is determined if the clusters should be updated and, if so, execution continues with S510. In an embodiment, it may be determined that the clusters should be updated if additional tracking information has been received, if additional multimedia content elements related to the user are available (i.e., if additional multimedia content elements that may be added to the personalized clusters have been received), and the like.

Figure 6:
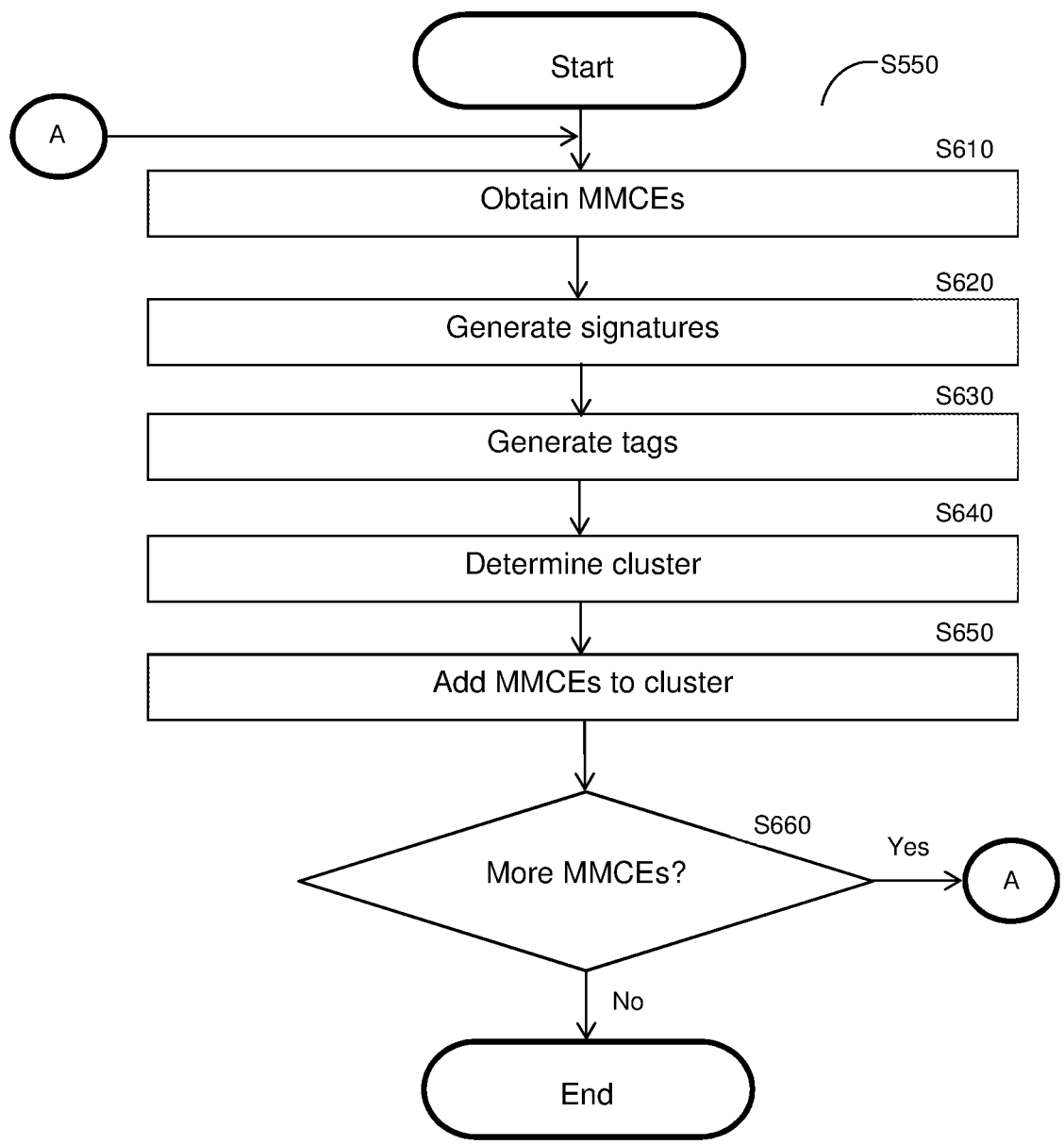
FIG. 6 is a flowchart illustrating a method for clustering multimedia content elements according to an embodiment.

FIG. 6 is an example flowchart S550 illustrating a method for clustering of multimedia content elements according to an embodiment.

At S610, at least one multimedia content element to be clustered is obtained. In an embodiment, the at least one multimedia content element may include multimedia content elements identified as related to the user (e.g., as described herein above with respect to S540, FIG. 5).

At S620, at least one signature is generated for each obtained multimedia content element. Each generated signature may be robust to noise and distortion. In an embodiment, the signatures are generated by a signature generator system as described further herein below with respect to FIGS. 3 and 4. In another embodiment, S620 may include sending, to a signature generator system (e.g., the signature generator system 140, FIG. 1), the multimedia content element and receiving, from the signature generator system, the at least one signature generated for each multimedia content element.

At optional S630, at least one tag is generated for the at least one multimedia content element based on the generated at least one signature. Each tag is a textual index term assigned to the multimedia content element as described further herein above. As non-limiting examples of tags, the tag "me" may be assigned to an image of the user's face, the tag "my dog" may be assigned to an image of a dog, and the tag "my dog and I" may be assigned to an image featuring both the user and a dog.

In an embodiment, S630 may include comparing the generated at least one signature to signatures of a plurality of multimedia content elements having assigned predetermined tags. In a further embodiment, tags of multimedia content elements having signatures that match one or more of the generated at least one signature may be generated as tags for the multimedia content element.

In another embodiment, the at least one tag may be generated based on metadata of concepts matching the at least one multimedia content element to be clustered. To this end, in a further embodiment, S630 may further include obtaining, from a DCC system (e.g., the DCC system 160, FIG. 1), at least one concept matching each multimedia content element to be clustered. In yet a further embodiment, S630 may further include querying the DCC system with respect to the signatures for each multimedia content element to be clustered.

At S640, at least one multimedia content element cluster is determined. Each determined multimedia content element cluster includes a plurality of multimedia content elements sharing a common concept. Each of the at least one multimedia content element also shares the common concept of the multimedia content element cluster. The common concept of a plurality of multimedia content elements may be a collection of signatures representing elements of the unstructured data and metadata describing the concept. The common concept may represent an item or aspect in the multimedia content element such as, but not limited to, an object, a person, an animal, a pattern, a color, a background, a character, a sub textual aspect, a meta aspect, words, sounds, voices, motions, combinations thereof, and the like. Multimedia content elements may share a common concept when each of the multimedia content elements is associated with at least one signature, at least one portion of a signature, at least one tag, or a combination thereof, that is common to all of the multimedia content elements sharing a common concept.

As noted above, in an embodiment, the common concept for each determined multimedia content element cluster is a personalized concept related to an interest of a user. For example, if a user interest is "theater," the determined at least one multimedia content element cluster includes a cluster with multimedia content elements having signatures indicating concepts such as "Broadway," "theater," and "plays," such as images and video showing theatrical performances and audio of songs from plays.

As non-limiting examples, the common concept may represent, e.g., a Labrador retriever dog shown in images or videos, a voice of the actor Daniel Radcliffe that can be heard in audio or videos, a motion including swinging of a baseball bat shown in videos, a subtext of playing chess, an indication that an image is a "selfie," and the like.

The common concept may be further based on levels of granularity. For example, the common concept may be related to cats generally such that any cats shown or heard in multimedia content elements is considered a common concept, or may be related to a particular cat such that only visual or audio representations of that cat are considered to be a common concept. Such granularity may depend on, e.g., a threshold for matching signatures, tags, or both, such that higher thresholds result in more granular results.

In another embodiment, the determined at least one multimedia content element may include only multimedia content elements of the same type as the obtained multimedia content element. For example, if the obtained multimedia content element is an image, only other images having a common concept may be determined. In yet another embodiment, multimedia content elements of different types may be determined. Which types of multimedia content elements may be determined may be based on, e.g., one or more rules.

As a non-limiting example of a common concept, for an image showing a person wearing a parachute with the sky in the background, a tag for the image may be "skydiving." The common concept may be the sub textual aspect "skydiving" indicating an activity that the person shown in the image is performing. Other multimedia content elements showing or otherwise illustrating people skydiving may also be associated with the tag "skydiving" and, therefore, the sub textual aspect "skydiving" is a common concept of the multimedia content elements.

As another non-limiting example of a common concept, for an audio clip in which a user recites information that the user wishes to reference later, a portion of a signature generated for the audio clip may be related to the meta aspect "note to self." In particular, a portion of the signature may be generated based on the words "note to self" spoken at the beginning of the audio clip. Other multimedia content elements may also have portions of signatures related to the concept "note to self" (e.g., other content illustrating the words "note to self" or similar phrases) and, therefore, the meta aspect "note to self" is a common concept of the multimedia content elements. In a further example, only multimedia content elements related to the particular user heard in the obtained multimedia content element (i.e., multimedia content elements featuring a voice of the user who recorded the obtained multimedia content element) may be determined as having a concept in common with the obtained multimedia content element such that the cluster includes only notes to self by the same user.

In an embodiment, if no existing multimedia content element clusters having a common concept with the multimedia content element can be found (e.g., if no multimedia content element clusters are associated with signatures or tags matching the generated at least one signature or the generated at least one tag above a predetermined threshold), S640 may include generating a new multimedia content element cluster. In a further embodiment, generating the new multimedia content element cluster may include searching in one or more data sources to identify multimedia content elements sharing a common concept with the obtained multimedia content element. The identified multimedia content elements may be clustered with the obtained multimedia content element.

At S650, each of the at least one multimedia content element sharing the common personalized concept with one of the determined at least one multimedia content element cluster is added to the respective determined multimedia content element cluster, thereby creating at least one personalized cluster. In an embodiment, S650 may further include storing the at least one personalized multimedia content element cluster in a storage (e.g., the database 150 of FIG. 1). As a non-limiting example, the personalized cluster may be stored in a server of a social media platform, thereby enabling other users to find the cluster during searches. Each cluster may be stored separately such that different groupings of multimedia content elements are stored in separate locations. For example, different clusters of multimedia content elements may be stored in different folders.

At S660, it is determined if additional multimedia content elements are to be clustered and, if so, execution continues with S605; otherwise, execution terminates.

Clustering of the multimedia content elements allows for organizing the multimedia content elements based on subject matter represented by various concepts. Such organization may be useful for, e.g., organizing photos captured by a user of a smart phone based on common subject matter. As a non-limiting example, images showing dogs, a football game, and food may be organized into different collections and, for example, stored in separate folders on the smart phone. Such organization may be particularly useful for social media or other content sharing applications, as multimedia content being shared can be organized and shared with respect to content. Additionally, such organization may be useful for subsequent retrieval, particularly when the organization is based on tags. As noted above, using signatures to classify the multimedia content elements typically results in more accurate identification of multimedia content elements sharing similar content. Further, by organizing multimedia content element based on subject matter known to be of interest to a user (e.g., as indicated in a user profile of the user), personalized clusters for the user may be created.

It should be noted that the embodiments described herein above with respect to FIG. 6 are discussed as including clustering multimedia content elements in series merely for simplicity purposes and without limitations on the disclosure. Multiple multimedia content elements may be clustered in parallel without departing from the scope of the disclosure. Further, the clustering method discussed above can be performed by the personalized clustering generator 130, or locally by a user device (e.g., the user device 110, FIG. 1).

Figure 7:
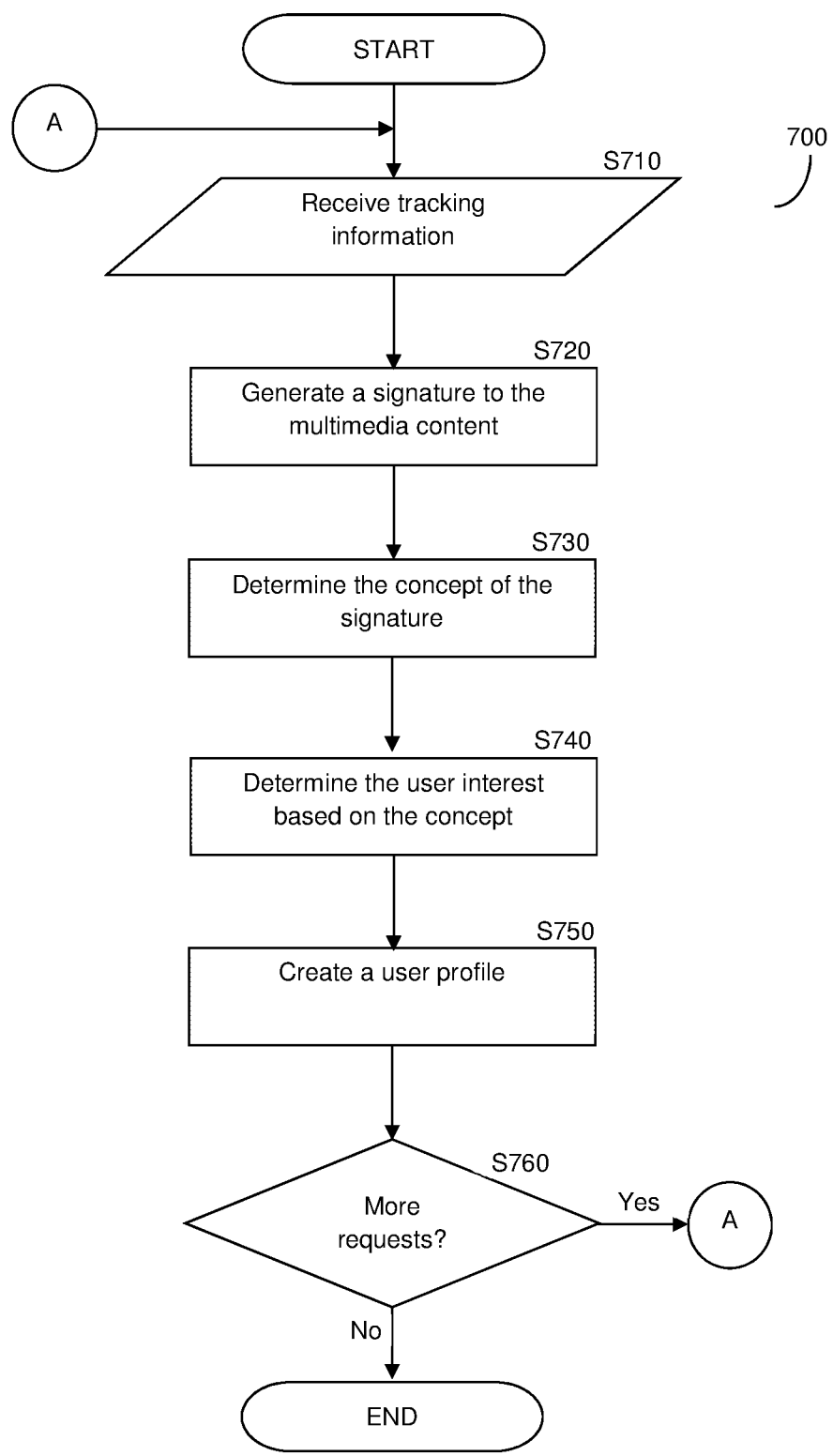
FIG. 7 is a flowchart illustrating a method for creating a user profile according to an embodiment.

FIG. 7 is an example flowchart 700 illustrating a method for profiling a user interest and creating a user profile based on an analysis of multimedia content elements according to an embodiment.

At S710, tracking information is received. According to this embodiment, the tracking information identifies multimedia elements (e.g., pictures, video clips, etc.) uploaded or viewed by the user from a web-browser (e.g., the app 115, FIG. 1) to one or more information sources. The information sources may include, but are not limited to, social networks, web blogs, news feeds, and the like. The social networks may include, for example, Google+®, Facebook®, Twitter®, Instagram, and so on. The tracking information includes the actual uploaded content or a reference thereto. This information may also contain the name of each of the information sources, text entered by the user with the uploaded image, a unique identification code assigned to a user of the web browser, user actions with respect to viewed multimedia content elements, or a combination thereof.

At S720, at least one signature for each multimedia element identified in the tracking information is generated. The signatures for the multimedia content elements are typically generated by a SGS (e.g., the SGS 140, FIG. 1) as described hereinabove.

At S730, the concept of each of the at least one signature generated for each multimedia element is determined. In one embodiment, S730 includes querying a concept-based database using the generated signatures.

At S740, the user interest is determined based on the concept or concepts associated with the identified elements. According to an embodiment, if text is entered by the user and the text is included in the tracking information, the entered text is also processed to provide an indication of whether the element described a favorable interest.

At S750, a user profile is created and the determined user interest is saved in a data warehouse. It should be noted that if a user profile already exists in the data warehouse, the user profile is only updated to include the user interest determined at S740.

At S760, it is checked whether there are additional requests, and if so, execution continues with S710; otherwise, execution terminates.

As a non-limiting example for the process described in FIG. 7, a picture of a user riding a bicycle is uploaded to the user's profile page in Facebook®. The image is then analyzed and a signature is generated therefore. A comment made by the user stating: "I love those field trips" is identified. Based on analysis of the concept of the uploaded picture and the user's comment, the user profile is determined as positive for field trips. The user profile is then stored or updated (if, e.g., the user profile already existed prior to this example) in a data warehouse for further use.

According to an embodiment, in such cases where several elements are identified in the tracking information, a signature is generated for each of these elements and the context of the multimedia content (i.e., collection of elements) is determined respective thereto. An example technique for determining a context of multimedia elements based on signatures is described in detail in U.S. patent application Ser. No. 13/770,603, filed on Feb. 19, 2013, assigned to the common assignee, the contents of which are hereby incorporated by reference.

It should be noted that the method described with respect to FIG. 7 is merely an example for creating a user profile. Other methods for creating user profiles may be equally utilized without departing from the scope of the disclosure. Some methods for creating user profiles are described further in U.S. patent application Ser. No. 14/280,928, assigned to the common assignee, the contents of which are hereby incorporated by reference.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a step in a method is described as including "at least one of A, B, and C," the step can include A alone; B alone; C alone; A and B in combination; B and C in combination; A and C in combination; or A, B, and C in combination.

All examples and conditional language recited herein are intended for pedagogical purposes to aid the reader in understanding the principles of the disclosed embodiments and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A system for clustering multimedia content elements, comprising:
   a processing circuitry; and
   a memory, the memory containing instructions that, when executed by the processing circuitry, configure the system to:
   determine, based on at least one user interest of a user, at least one personalized concept, wherein each personalized concept represents one of the at least one user interest of the user;
   wherein the at least one user interest of the user is determined based on one or more images of a user profile of the user;
   obtain at least one multimedia content element (MMCE) related to the user;
   generate at least one signature for the obtained at least one MMCE, each signature representing at least a portion of the obtained at least one MMCE;
   determine, based on the generated at least one signature, at least one MMCE cluster, wherein each MMCE cluster includes a plurality of clustered MMCEs sharing a common concept, wherein each common concept is one of the determined at least one personalized concept; and
   create at least one personalized MMCE cluster by adding, to each determined MMCE cluster that becomes a personalized MMCE cluster, at least one of the obtained at least one MMCE sharing the common concept of the cluster.

2. The system of claim 1, wherein the system is further configured to: generate, based on the generated at least one signature, at least one tag for the obtained at least one MMCE, wherein the at least one MMCE cluster is determined based further on the generated at least one tag.

3. The system of claim 2, wherein each MMCE cluster includes a plurality of MMCEs associated with the generated at least one tag.

4. The system of claim 2, wherein the system is further configured to: query, with respect to the generated at least one signature, a deep content classification system to obtain at least one concept matching the at least one MMCE, each concept including a signature reduced cluster and metadata, wherein the at least one tag is generated based on the metadata of the obtained at least one concept.

5. The system of claim 1, wherein the at least one user interest of the user is at least one topic of interest to the user.

6. The system of claim 5, wherein the one or more images of the user profile comprise a plurality of tracked images; wherein each tracked image is at least one of:
uploaded by the user, and viewed by the user;
wherein the system is configured to generate, for each tracked image, at least one signature;
wherein the at least one interest of the user is determined based on the generated at least one signature for each tracked image.

7. The system of claim 1, further comprising: a signature generator system, wherein each signature is generated by the signature generator system, wherein the signature generator system includes a plurality of computational cores configured to receive a plurality of unstructured data elements, each computational core of the plurality of computational cores having properties that are at least partly statistically independent of other of the computational cores, wherein the properties of each core are set independently of each other core.

8. The system of claim 7, wherein each signature is robust to noise and distortion.

9. The system of claim 1, wherein the system is further configured to:
determine, for each personalized concept, whether an existing MMCE cluster having the personalized concept as a common concept can be found; and
generate a MMCE cluster, when it is determined that an existing MMCE cluster having the personalized concept as a common concept cannot be found, wherein the determined at least one MMCE cluster is the generated MMCE cluster.

10. The system of claim 1, wherein the at least one signature is generated via a signature generator system, wherein the signature generator system includes a plurality of at least partially statistically independent computational cores, wherein the properties of each computational core are set independently of properties of each other computational core.

11. The system of claim 1, wherein the system is further configured to: generate a personalized mosaic, wherein the personalized mosaic includes at least one of: an icon representing each personalized MMCE cluster, and a textual description of each personalized MMCE cluster.

12. The system of claim 1, wherein each personalized concept is a collection of signatures representing a plurality of MMCEs and metadata describing the concept.

13. A method for generating personalized clusters of multimedia content elements, comprising:
determining, based on at least one user interest of a user, at least one personalized concept, wherein each personalized concept represents one of the at least one user interest;
wherein the at least one user interest of the user is determined based on one or more images of a user profile of the user;
obtaining at least one multimedia content element (MMCE) related to the user;
generating at least one signature for the obtained at least one MMCE, each generated signature representing at least a portion of the obtained at least one MMCE;
determining, based on the generated at least one signature, at least one MMCE cluster, wherein each MMCE cluster includes a plurality of clustered MMCEs sharing a common concept, wherein each common concept is one of the determined at least one personalized concept; and
creating at least one personalized MMCE cluster by adding, to each determined cluster that becomes a personalized MMCE cluster, at least one of the obtained at least one MMCE sharing the common concept of the cluster.

14. The method of claim 13, further comprising: generating, based on the generated at least one signature, at least one tag for the obtained at least one MMCE, wherein the at least one MMCE cluster is determined based further on the generated at least one tag.

15. The method of claim 14, wherein each MMCE cluster includes a plurality of MMCEs associated with the generated at least one tag.

16. The method of claim 14, wherein generating the at least one tag further comprises: querying, with respect to the generated at least one signature, a deep content classification system to obtain at least one concept matching the at least one MMCE, each concept including a signature reduced cluster and metadata, wherein the at least one tag is generated based on the metadata of the obtained at least one concept.

17. The method of claim 13, further comprising:
determining, for each personalized concept, whether an existing MMCE cluster having the personalized concept as a common concept can be found; and
generating a MMCE cluster, when it is determined that an existing MMCE cluster having the personalized concept as a common concept cannot be found, wherein the determined at least one MMCE cluster is the generated MMCE cluster.

18. The method of claim 13, wherein the at least one signature is generated via a signature generator system, wherein the signature generator system includes a plurality of at least partially statistically independent computational cores, wherein the properties of each computational core are set independently of properties of each other computational core.

19. The method of claim 13, wherein is at least one topic of interest to the user.

20. The method of claim 13 wherein the one or more images of the user profile comprise a plurality of tracked images; wherein each tracked image is
at least one of: uploaded by the user, and viewed by the user;
generating, for each tracked image, at least one signature; wherein the at least one interest of the user is determined based on the generated at least one signature for each tracked image.

21. The method of claim 13, further comprising: generating a personalized mosaic, wherein the personalized mosaic includes at least one of: an icon representing each personalized MMCE cluster, and a textual description of each personalized MMCE cluster.

22. The method of claim 13, wherein each personalized concept is a collection of signatures representing a plurality of MMCEs and metadata describing the concept.

23. A non-transitory computer readable medium having stored thereon instructions for causing a processing circuitry to execute a process, the process comprising:
- determining, based on at least one user interest of a user, at least one personalized concept, wherein each personalized concept represents one of the at least one user interest of the user;
- obtaining at least one multimedia content element (MMCE) related to the user; wherein the at least one user interest of the user is determined based on one or more images of a user profile of the user;
- generating at least one signature for the obtained at least one MMCE, each signature representing at least a portion of the obtained at least one MMCE;
- determining, based on the generated at least one signature, at least one MMCE cluster, wherein each MMCE cluster includes a plurality of clustered MMCEs sharing a common concept, wherein each common concept is one of the determined at least one personalized concept; and
- creating at least one personalized MMCE cluster by adding, to each determined MMCE cluster that becomes a personalized MMCE cluster, at least one of the obtained at least one MMCE sharing the common concept of the cluster.

* * * * *